United States Patent
Russell et al.

(10) Patent No.: US 9,167,315 B2
(45) Date of Patent: *Oct. 20, 2015

(54) METHOD AND APPARATUS FOR COMMUNICATING EMERGENCY INFORMATION

(71) Applicant: AT&T Intellectual Property I, LP, Atlanta, GA (US)

(72) Inventors: Sam Russell, Tinton Falls, NJ (US); Steven Charles Salimando, Little Silver, NJ (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/703,133

(22) Filed: May 4, 2015

(65) Prior Publication Data

US 2015/0237413 A1    Aug. 20, 2015

Related U.S. Application Data

(63) Continuation of application No. 13/678,837, filed on Nov. 16, 2012, now Pat. No. 9,055,350.

(51) Int. Cl.
*H04N 7/10* (2006.01)
*H04N 21/81* (2011.01)
*H04N 21/6405* (2011.01)

(52) U.S. Cl.
CPC ......... *H04N 21/814* (2013.01); *H04N 21/6405* (2013.01)

(58) Field of Classification Search
None
See application file for complete search history.

(56) References Cited

U.S. PATENT DOCUMENTS

| | | | |
|---|---|---|---|
| 4,536,791 A | 8/1985 | Campbell et al. | |
| 5,850,218 A | 12/1998 | Lajoie | |
| 6,204,761 B1 | 3/2001 | Vanderable | |
| 7,840,975 B2 | 11/2010 | Matheny et al. | |
| 8,026,806 B2 | 9/2011 | Hasek | |
| 2007/0226762 A1* | 9/2007 | Girgis et al. | 725/33 |
| 2008/0059998 A1* | 3/2008 | McClenny et al. | 725/33 |
| 2008/0104631 A1 | 5/2008 | Krock et al. | |
| 2008/0120639 A1 | 5/2008 | Walter | |
| 2008/0194224 A1 | 8/2008 | Thorson et al. | |
| 2009/0222852 A1 | 9/2009 | Bartolome | |
| 2009/0247116 A1* | 10/2009 | Sennett et al. | 455/404.2 |
| 2009/0276804 A1* | 11/2009 | Hamada et al. | 725/33 |
| 2010/0122284 A1* | 5/2010 | Yoon et al. | 725/33 |
| 2011/0088058 A1 | 4/2011 | Velazquez et al. | |
| 2011/0103302 A1 | 5/2011 | Hall | |
| 2012/0102522 A1 | 4/2012 | Long | |
| 2012/0185897 A1 | 7/2012 | Gould | |

* cited by examiner

*Primary Examiner* — John Schnurr
*Assistant Examiner* — Cynthia Fogg
(74) *Attorney, Agent, or Firm* — Guntin & Gust, PLC; Joseph Hrutka (57) ABSTRACT

A method that incorporates teachings of the subject disclosure may include, for example transmitting, by a system comprising a processor, via a first emergency media channel a first video stream comprising first evacuation routing information for a first evacuation group responsive to receiving a notification of an emergency event, instructing, by the system, a first media processor device to select the first emergency media channel while disabling selection of other media channels according to the first evacuation routing information, where the content of the emergency media channel is presented at a display device by way of the first media processor device, and enabling, by the system, the first media processor device to select the other media channels responsive to receiving user input acknowledging the emergency media channel. Other embodiments are disclosed.

20 Claims, 7 Drawing Sheets

METHOD AND APPARATUS FOR COMMUNICATING EMERGENCY INFORMATION

CROSS-REFERENCE TO RELATED APPLICATIONS

This application is a Continuation of and claims priority to U.S. patent application Ser. No. 13/678,837, filed Nov. 16, 2012. The content of each of the foregoing is hereby incorporated by reference into this application as if set forth herein in full.

FIELD OF THE DISCLOSURE

The subject disclosure relates to a method and apparatus for communicating emergency information.

BACKGROUND

Media content is typically experienced by consumers via devices such as computers, televisions, radios, and mobile electronics. Media content is frequently delivered by service providers, who send the content, such as television, radio, and video programming, to consumers for enjoyment at their physical locations. Modern communication networks benefit from interconnectivity between consumers and various communication devices. As network capabilities expand, these interconnections provide new opportunities to enhance the ability for consumers to enjoy media content by experiencing a variety of content over multiple devices. Intelligent devices offer new means for the enjoyment of content in ways that anticipate consumer desires, including the personalization of media content presentation. Emergency warning messages are often attached to broadcasted media content. As modern communication networks expand consumer media choices, networking capabilities provide unique opportunities for providing emergency information.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for transmitting a video stream over an emergency media channel to provide evacuation routing information associated with a geographic region responsive to receiving an emergency notification, instructing a media processor device to select the emergency media channel while disabling other media channels. Other embodiments are included in the subject disclosure.

One embodiment of the subject disclosure includes a memory storing computer instructions and a processor coupled to the memory. The processor can perform operations responsive to executing the computer instructions including receiving first location information for a first media processor device. The processor can also perform operations for transmitting the first location information to an emergency response service for generating first evacuation routing information according to the first location information. The processor can further perform operations for receiving a notification of an emergency event from the emergency response service. The notification can include the first evacuation routing information associated with the first media processor device. The processor can perform operations for transmitting via a first emergency media channel a first video stream comprising the first evacuation routing information responsive to receiving the notification. The processor can further perform operations for instructing the first media processor device to select the first emergency media channel while disabling selection of other media channels according to the first evacuation routing information. The first media processor device can present content of the emergency media channel at a display device. The processor can further perform operations for receiving an acknowledging indicator from the first media processor device and, in turn, instructing the first media processor device to enable selection of the other media channels responsive to receiving the acknowledging indicator.

One embodiment of the subject disclosure includes a computer-readable storage medium including computer instructions, which, responsive to being executed by a processor, can cause the processor to perform operations including receiving a selection a first media channel of communication network of a service provider. The computer instructions can further include presenting media content that is received from the media channel at a display device. The computer instructions can further include switching to a first emergency media channel comprising a first video stream of first evacuation routing information responsive to a command received from an emergency alert service. The computer instructions can, in turn, include presenting the first evacuation routing information from the first emergency channel at the display device.

One embodiment of the subject disclosure includes a method including transmitting, by a system comprising a processor, via a first emergency media channel a first video stream comprising first evacuation routing information for a first evacuation group responsive to receiving a notification of an emergency event. The method can also include instructing, by the system, a first media processor device to select the first emergency media channel while disabling selection of other media channels according to the first evacuation routing information. The content of the emergency media channel can be presented at a display device by way of the first media processor device. The method can further include enabling, by the system, the first media processor device to select the other media channels responsive to receiving a user input acknowledging the emergency media channel.

Figure 1:
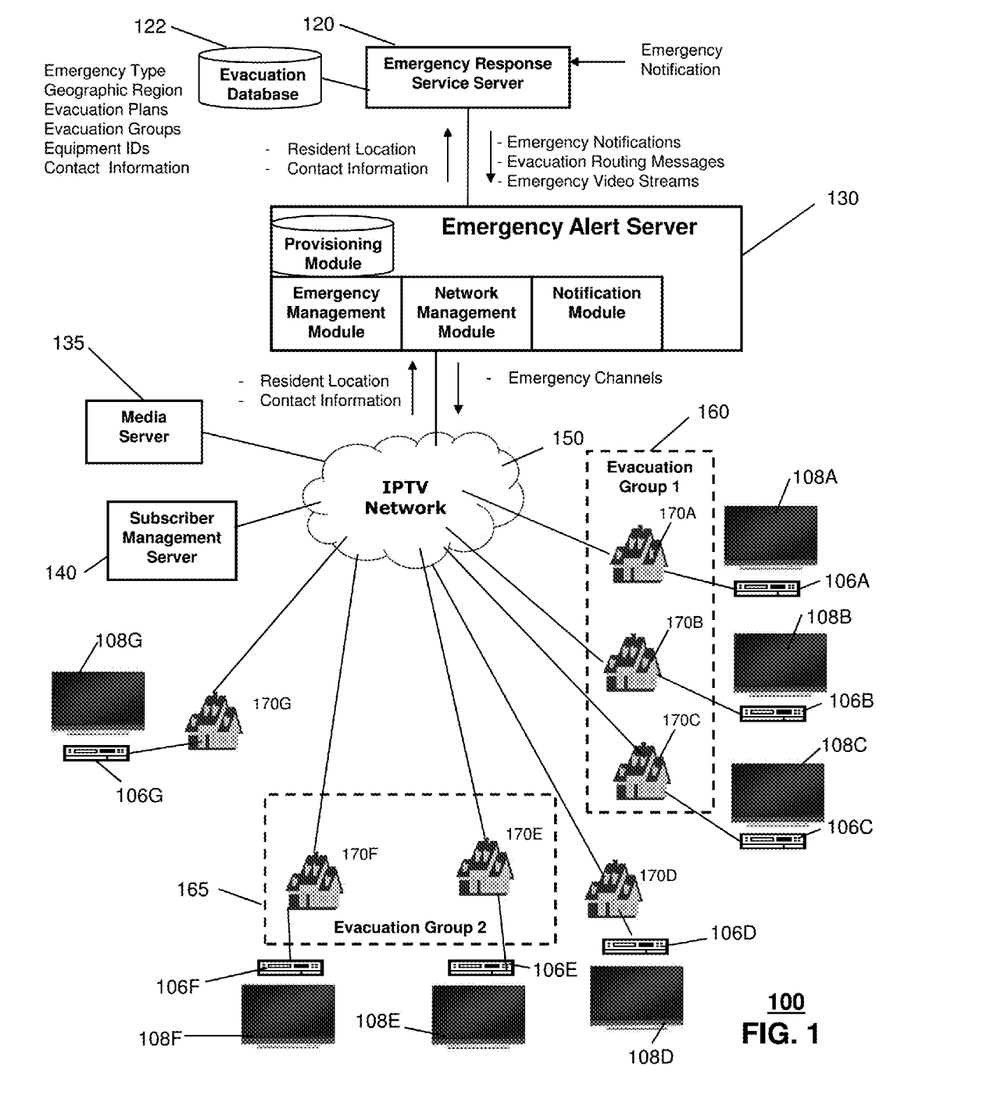
FIG. 1 depicts illustrative embodiments systems that can be utilized for providing emergency information in a networked media content system.

FIG. 1 depicts an illustrative embodiment of a system 100 that can be utilized for providing emergency information in a networked media content system. The system 100 can include an emergency alerting service, or EA, server 130 that can perform several functions for providing emergency information to subscribers of a media content provider. In one embodiment, the EA server 130 can obtain information regarding the locations of subscriber premises 170A-G, contact information, and/or network addressing information for subscriber media processor devices 106A-G.

The EA server 130 can provide the subscriber information to an emergency response service, such as a local police department, fire department, emergency response coordinator, homeland security coordinator, and/or emergency dispatch. The emergency response service (ERS) can utilize an ERS server 120 to facilitate processing of emergency notifications and to maintain evacuation plans. In one embodiment, an ERS server 120 can use subscriber information in developing evacuation routings, evacuation groups, emergency contact plans, and/or emergency video messages. In one embodiment, the emergency response service can create an evacuation plan for every residence in a geographic area. For example, a county can be located in a regional geographic area. The emergency response service can subdivide the county into a series sub-regions, neighborhoods, and/or sections. In various embodiments, the divisions and sub-divisions of the geographic region can be based on factors such as proximity to major roads, divisions in electrical or communications grids, proximity to evacuation centers or hospitals, proximity to major businesses or schools, and/or population density. In one embodiment, the emergency response service can develop evacuation plans, in advance, for foreseeable emergency events, such as natural or weather related events, terrorism events, civil unrest, and/or hazardous material events. In another embodiment, the emergency response service can create evacuation groups for residences and businesses in each division or subdivision of the geographic regions. For example, all the residents in a neighborhood can be placed into an evacuation group 160, 165 that is assigned an evacuation location, such as school building or civic center, and an evacuation routing to travel from the neighborhood to the evacuation location in the event of an emergency event. The emergency response service can generate many evacuation plans and evacuation groups, and variations on these plans and groups, in advance of emergencies so that, during the actual emergency event, the resources of the organization can be focused on disseminating accurate communications and coordination of services.

In one embodiment, the ERS server 120 can obtain subscriber information from the EA server 130. In one embodiment, a provisioning module at the EA server 130 can provide subscriber information to the ERS server 120. For example, the EA server 130 can periodically report subscriber information to the emergency response server 120. Alternatively, the EA server 130 can update subscriber information anytime a subscriber is added, deleted, or changes address or contact information. In one embodiment, subscribers can opt in or opt out of the emergency alert service. In one embodiment, subscribers can provide location and contact information for use by the EA server 130 and the ERS server 120 rather than allowing the system 100 to use information from the subscriber management server 140. For example, a subscriber could have a subscription to media services, such as television and movie channels, from a first service provider but one or more other subscriptions for telephone service, internet service, and/or cellular phone service with other providers. If the subscriber wanted to fully participate in the emergency alert service with the first provider, then the subscriber could supply telephone, cellular, and/or internet contact information to the first provider. In one embodiment, a subscriber can log onto a website of the provider through a portal to provide this information.

In one embodiment, the ERS server 120 can correlate the obtained subscriber information to evacuation planning and groups. For example, each premises and/or business 170A-C in a first evacuation group 160 can be included in an evacuation database 122 maintained by the ERS server 120. The evacuation database 122 can further include records for each premises 170A-G in the geographic region, sub-region, and/or evacuation group. The premises records can include contact information associated with any of premises 170A-G. For example, first premises 170A of a first evacuation group 160 can be associated with a subscriber to a service provider that is operating the internet protocol television network 150. Identification information associated with a media processor device 106A and/or a premises gateway, not shown, can be included as records in the database 122. The identification information can take the form of an internet address, a URL address, a MAC address, or local router or hub information. The identification information can be encoded such that the evacuation database 122 cannot contact the premises equipment directly but has to rely on the resources of the EA server for passing information to the equipment 106A. Additional information, such as telephone numbers, cellphone numbers, electronic mail addresses, and/or social media contact information can be included in the evacuation database. In another embodiment, the evacuation database 122 can be maintained at the EA server 130.

The media server 135 can provide media content to media processor devices 106A-G at subscriber premises 170A-G. The media processors 106A-G can present received media content at display devices 108A-G. The media server 135 can be a portion of a subscription content service, such as cable, satellite, or DSL based media content delivery system. The media server 135 provide any type of content, such as but not limited to broadcast television, cable or premium television, video on demand, or pay-per-per view television. The media server 135 can deliver the media content to the media processor devices 106A-G by means of internet protocol television network 150. In other embodiments, the media server 135 can deliver media content by a private communication network, a public communication network, such as the World Wide Web. In other embodiments, the media server 135 can deliver media content over any type of transport media, such as a satellite link, a cable line, and/or a fiber optic network.

The subscriber management server 140 can manage subscriber accounts by maintaining information regarding subscriber service configurations, premises locations, payment histories, and media processor device 106A-G and gateway devices at each location. The subscriber management server 140 can maintain information on additional services provided to subscribers, such as telephone, internet access, security services, and/or cellular telephone services. The media content can be received at the media processor devices 106A-D by a gateway device at each location. In one embodiment, each gateway device can function as an interface between the internet protocol television network 150 and one or more media processor devices 106A-G each located at, for example, premises 170A-G of a subscriber to the media service provider. In one embodiment, each gateway device at each premises 170A-G can provide internetworking functions, such as protocol translation, impedance matching, data rate conversion, and/or fault isolation necessary for exchanging data between the internet protocol television network 150 and each media processor device 106A-G. Each subscriber premises 170A-G can have one or more display devices 108A-G for presenting the media content to the subscriber or to other viewers.

Each media processor device 106A-G can be utilized at the viewing premises to present the media content at each display device 108A-G. The media processor device 106A-G can be, for example, a set-top box, a computer device, or a mobile device. The media processor device 106A-G and the display device 108A-G can be integrated into a single device, such as a television with a built in set-top box or a mobile device with integrated media processor functionality. Each media processor device 106A-G can receive the media content as encoded data packet streams and can decode the received data streams into decoded stream that can be delivered to the display device 108A-G for presentation. In other embodiments, the media processor device 106A-G can further perform functions of providing an electronic programming guide for selection of programming from the media server 135, authentication of the media processor device 106A-G for reception of media content, storage and updating of user preferences, and/or parental control of media content. The media processor device 106A-G can be controlled utilizing a remote controller device. In one embodiment, the media processor device 106A-G can cause the received media content to be presented at a display device 108A-G that is visible to the viewing area at the subscriber's premises 170A-G.

In one embodiment, during an emergency event, the ERS server 120 can receive an emergency notification. The emergency notification can be generated locally or can be generated by a remote organization. For example, a local civil defense organization or fire department could generate an emergency notification based on local conditions. Alternatively, the National Weather Service or the Department of Homeland Security can issue a notification or warning of an emergency. The emergency notification can be received over a communications link or network, such as an internet protocol network, a telephone network, or a cellular network. In one embodiment, the emergency notification includes a geographic region for the emergency. For example, a warning of an imminent flash flood might seriously impact several counties near a river while counties on higher ground would be minimally affected. In one embodiment, the ERS server 120 can analyze the received emergency notification to determine the type of event, such as a flood, fire, storm, or terrorist attack, and the impacted geographic region. For example, the ERS server 120 can search the evacuation database 122 for emergency type and/or geographic region information that matches the incoming emergency notification.

In one embodiment, if the ERS server 120 determines that the emergency type and/or region matches an evacuation plan in the evacuation database 122, then the ERS server 120 can access the evacuation plan and group data. In one embodiment, the evacuation database can have several different plans for each geographic area depending on the type of emergency or, further, depending on a severity of an emergency of a given type. For example, an emergency involving a tornado could include a further classification of a warning or watch. The evacuation database 122 could include different evacuation plans for these two classifications. In another embodiment, the evacuation database 122 can include different evacuation plans for different sub-regions or subdivisions within the affected geographic regions. For example, an emergency notification of a wildfire near a geographic region could implicate a first sub-region and a second sub-region. In the first sub-region, a first evacuation plan can call for an immediate movement of people according to a first evacuation group 160 to a safe area near a shopping center. At the same time, a second evacuation plan can call for persons in the second region to wait for further instructions from the fire department before leaving their homes as part of a second evacuation group 165. Furthermore, the geographic region for the emergency could include another sub-region for which no evacuation plan is given. For example, premises 170D could be inside of the geographic region but outside of the first evacuation group 160 and the second evacuation group 165.

In one embodiment, the ERS server 120 can generate emergency notifications, evacuation routing messages, and/or emergency video streams based on the evacuation database 122. In one example, the ERS server 120 can generate messages warning geographic regions of an emergency situation. In one embodiment, the ERS server 120 can generate evacuation routing messages with specific instructions based on the evacuation plans and groups of the database 122. In one embodiment, the ERS server 120 can generate emergency video streams based on the evacuation routing information or based upon emergency notification information. For example, the ERS server 120 can generate a video or still image with evacuation routing information, such as a graphical image showing an affected area, a routing to an evacuation location, and/or physical details of the evacuation location. The video loop can also show textual information detailing the evacuation routing. In one embodiment, the ERS server 120 can access a set of pre-prepared video streams from the evacuation database 122. In one embodiment, the ERS server 120 can transmit the emergency notifications, evacuation routing messages, and/or emergency video streams to the EA server 130. In one embodiment, the EA server 130 can receive the emergency notifications and/or evacuation routing messages and can generated emergency video streams based on this information. In another embodiment, the emergency video streams are generated at the ERS server 120 and passed to the EA server 130 for distribution. In another embodiment, some emergency video streams are generated at both the ERS server 120 and the EA server 130.

In one embodiment, the EA server 130 can distribute the emergency video streams to subscriber devices over the internet protocol television network 150. In one embodiment, each emergency video stream includes an identification of subscriber devices that are targeted to receive the video stream. The identification information can take the form of an internet address, a URL address, a MAC address, or local router or hub information. In one embodiment, the identification information can be encoded into the emergency video stream or can be associated with the stream using a special header or file. In one embodiment, the EA server 130 can deliver the emergency video stream using one or more emergency channels of the internet protocol television network 150. For example, several emergency channels can be set aside in each geographic region for broadcasting emergency video streams targeted to local subscribers. During normal conditions, the emergency channels can carry no information or can carry mere labeling information that notifies the electronic programming guide and the viewer of the potential use for each channel. During an emergency, the EA server 130 places an emergency video stream, targeted to a particular evacuation group 160, on one or more of the emergency channels. The EA server 130 then causes the internet protocol television network 150 to route the emergency channel to a communication switch for the evacuation group. For example, the EA server 130 can determine that an emergency video stream is targeted to a first evacuation group 160 and can cause an emergency channel to be routed to a communications switch that feeds a service area that includes the first evacuation group 160.

Under non-emergency conditions, it is likely that none of the subscriber media processor devices 106A-C in the first evacuation group 160 is tuned to the emergency channel. Therefore, the emergency channel will typically not be subject to any local multicasting at the communication switch prior to an action by the EA server 130. In one embodiment, the EA server 130 can cause a multicast group to be created for the emergency channel at the communications switch. In one embodiment, the emergency channel is sent to every subscriber media processor device 106A-C in the first evacuation group 160. In one embodiment, the EA server 130 causes every subscriber media processor device 106A-C to select the emergency channel for presentation at its local display device 108A-C. In one embodiment, the EA server 130 can cause a communication switch to signal the media processor device 106A to select a specific emergency channel. In another embodiment, the EA server 130 can signal the media processor device 106A to switch to a default channel, where the switch insures that the emergency channel is sent to this channel for reception and decoding at the media processor device 106A. In another embodiment, the EA server 130 signals the subscriber media processor device 106A to wake for power on or to wake from a sleep mode before selecting the emergency channel. As a result, each subscriber media processor device 106A-C in the first evacuation group 160 selects the emergency channel and presents this channel at its display device 108A-C. In another embodiment, the media processor devices 106A-C can cause the display devices 108A-C to power up, where this capability is supported at the media processor devices 106A-C. In one embodiment, the EA server 130 delivers the emergency channel through the media server 135.

In one embodiment, the EA server 130 can determine that other subscriber media processor devices 170D-G are not in the targeted first evacuation group 160. In one embodiment, where a subscriber media processor device 170D is not targeted, then this device continues to receive its current media channel via the media server 135. In one embodiment, an emergency channel can be delivered that includes evacuation routing information that is intended to cause the viewer to respond by evacuation from the premises location as directed in the information. In another embodiment, the emergency channel can include an emergency notification that is intended to inform the viewer at the premises but not necessarily elicit an evacuation.

In one embodiment, the EA server 130 can cause a subscriber media processor device 106A to be locked onto the emergency channel. For example, the EA server 160 can disable the channel changing functions of the media processor device 106A until the viewer performs a required action. In another embodiment, the media processor device 106A can continue to present the emergency channel at the display device 108A until the EA server 130 unlocks the media processor device 106A. For example, the channel selection functions of the media processor device 106A can be disabled until a viewer has entered a code into the device 106A or otherwise acknowledged that the viewer has seen and understood the contents of the evacuation message. In another example, channel switching at the media processor device 106A can be disabled until the EA server 130 signals to the media processor device 106A that it is permitted to allow a change of channels. For example, channel changes can be disabled until the EA server 130 receives instructions from the ERS server 120 to resume normal operations.

Figure 2:
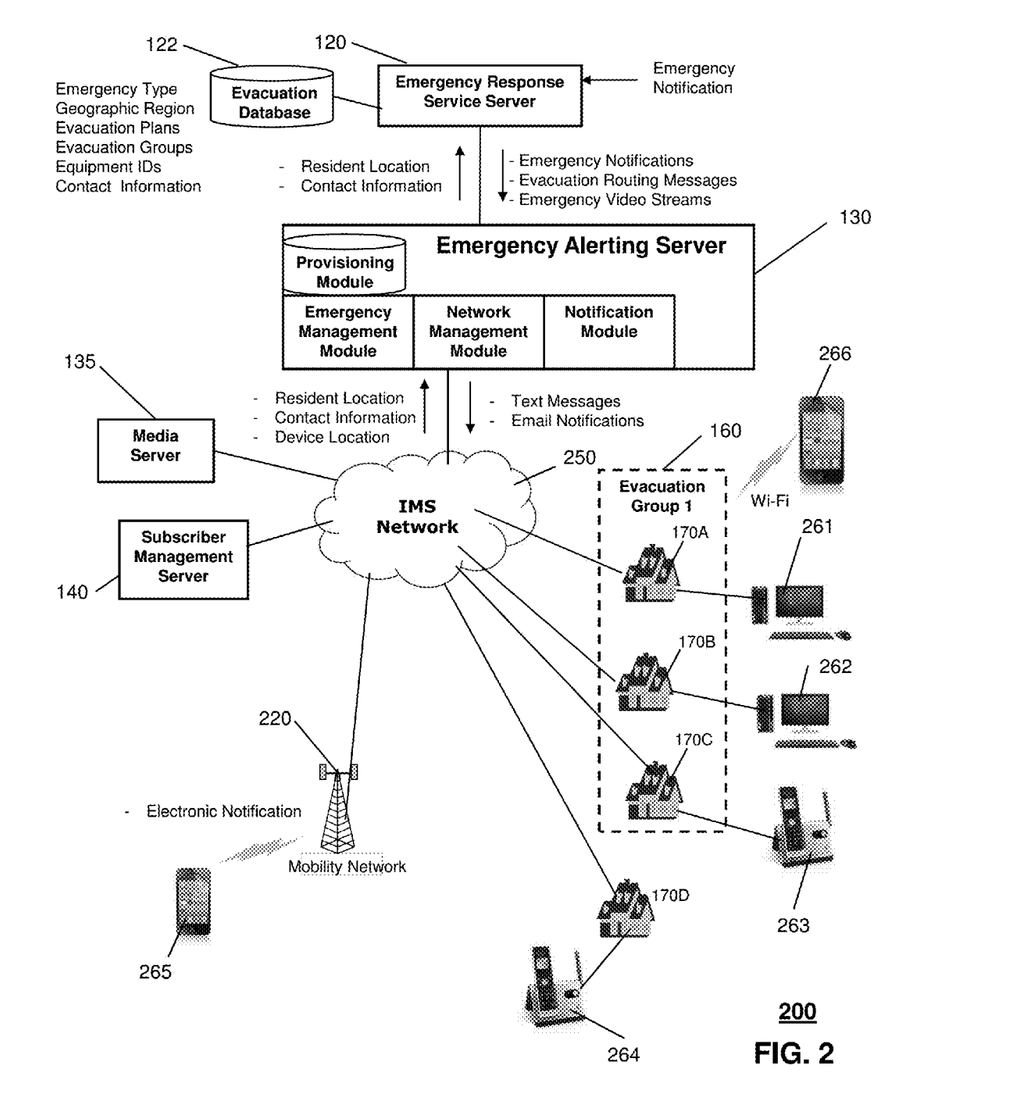
FIG. 2 depicts illustrative embodiments systems that can be utilized for providing emergency information in a networked telecommunications system.

FIG. 2 depicts another illustrative embodiment of a system 200 that can be utilized for providing emergency information in a networked telecommunications system. In one embodiment, subscriber computer devices 261 and 262 can be connected to the IMS network 250 at, for example, first subscriber premises 170A and 170B. The subscriber computer devices 261 and 262 can communicate through the IMS network 250 using, for example, internet protocol, to access other devices over the world-wide web and to exchange electronic mail messages (e-mail). In one embodiment, telephone devices 263 and 264, can be connected to the IMS network 250 at second subscriber premises 170C and 170D. In another embodiment, a mobile communication device 265 can be connected to the IMS network through a mobility network 220.

In one embodiment, the EA server 130 can be coupled to an internet protocol multimedia subsystem (IMS) network 250. In one embodiment, the EA server 130 can obtain contact information for subscriber devices 261-265 from the media server 135 and/or the subscriber management server 140. The subscriber device 261-265 contact information can be provided to the ERS server 120 for use in generating evacuation plans and evacuation groups. The ERS server 120 can include the device contact information in the evacuation database 122. In one embodiment, the ERS server can generate emergency notification and evacuation routing messages based upon emergency plans and/or evacuation routings. The emergency notification and evacuation routing messages can be prepared in advance of an emergency situation, during the emergency situation, and/or prepared in advance but modified to particular circumstances of the emergency situation. The ERS server 120 can transmit the emergency notification and evacuation routing messages to the EA server 130 for distribution during an emergency situation. In one embodiment, the EA server can transmit electronic mail messages to internet mail services. These electronic mail messages can be retrieved and presented at subscriber computer devices 261 and 262 and/or cellular devices 265. For example, the ERS server 120 can determine from an emergency notification that an evacuation message must be sent to a first evacuation group 160 that includes several subscriber premises 170A-C. The ERS server 120 can retrieve contact information for the first evacuation group 160 including electronic messaging (email) addresses for subscribers at the first evacuation group 1 160.

In one embodiment, the EA server 130 can transmit electronic text messages (SMS) to mobile communication devices 265. These electronic mail messages can be received and presented at subscriber mobile communication devices 265. For example, the ERS server 120 can determine from an emergency notification that an evacuation message must be sent to a first evacuation group 160 that includes several subscriber premises 170A-C. In another embodiment, the EA server 130 can transmit electronic text messages to second mobile computing devices 266, such as smart pad devices, over a Wi-Fi communication link. For example, the text messages can be sent to the second mobile computing device 266 over Wi-Fi links that are controlled and operated by gateway devices. The ERS server 120 can retrieve contact information for the first evacuation group including telephone numbers and/or internet protocol addresses for mobile communication devices 265. In one embodiment, the EA server 130 can send an electronic text message to mobile communication devices 265 based on premises locations associated with the mobile communication devices. For example, where a subscriber resides at premises 170D, a mobile communication device 265 associated with the subscriber would receive a text message associated with the emergency situation occurring at the premises 170D. In another embodiment, a location can be determined for the mobile communication device 265, and this location can be used by the ERS server 120 and/or the EA server 130 to determine the content of the text message. For example, the mobile communication device 265 could be presently located within a geographic area that includes the first evacuation group 160. The EA server 130 can report this location for the mobile communication device 265 to the ERS server 120. The ERS server 120 can add the mobile communication device 265 to a listing of subscriber devices in the first evacuation group 160 that must be notified in the emergency situation. The EA server 130 can then send a text message to the mobile communication device 265 including the first evacuation group information. In another embodiment, the EA server 130 can detect that the mobile communication device 265 is in a location that differs from its subscriber premises 170D and can assign a text message to the mobile communication device 265 according to the actual location of the device 265. In another embodiment, the mobile communication device 265 can receive notifications based on both the location of the subscriber premises 170D and the location of the device 265. In one embodiment, the location of the mobile communication device 265 can be determined using global positioning system (GPS) detection in the device 265. In another embodiment, the position can be derived by determining positions of one or more positions of cellular towers of the mobility network 220 that are presently communicating with the device mobile communication device 265.

Figure 3:
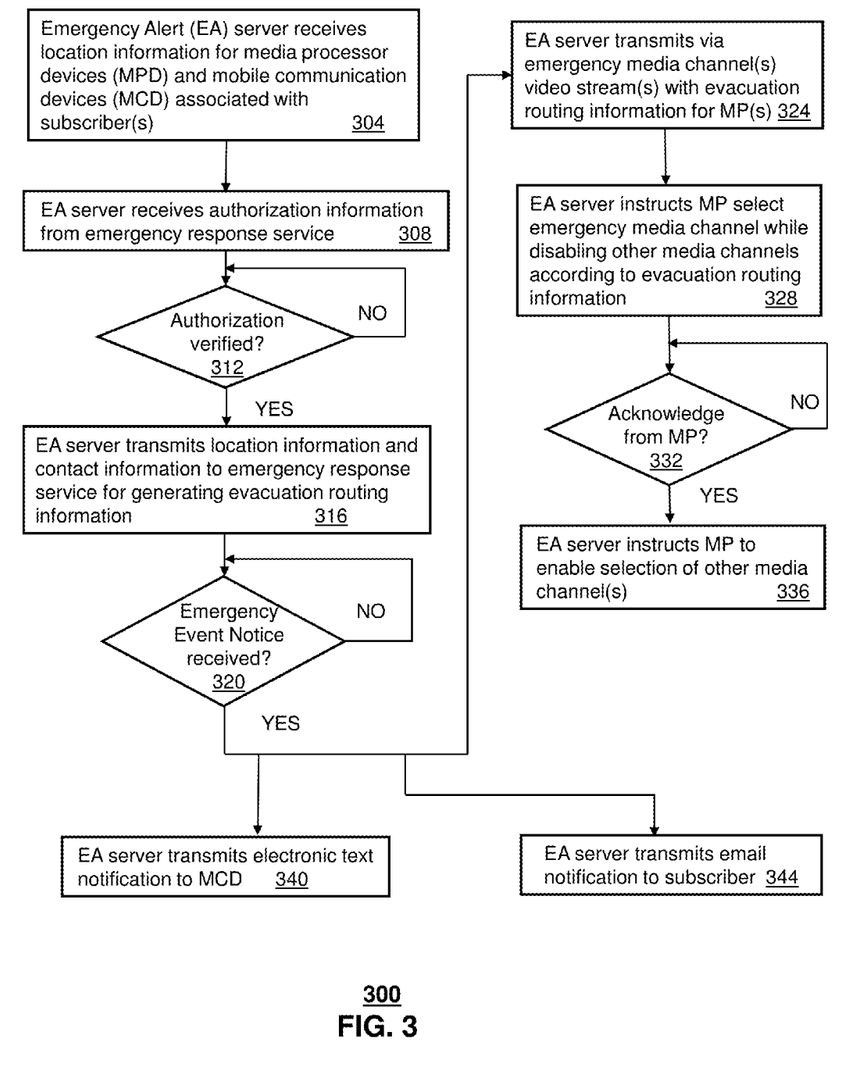
FIG. 3 depicts an illustrative embodiment of a method operating in portions of the system described in FIGS. 1-2 and 4-5.

FIG. 3 depicts an illustrative embodiment of a method operating in portions of the systems and devices described in FIGS. 1-5. Method 300 can begin with step 304, in which an emergency alert server 130 can receive location information for media processor devices 106A-G and mobile communication devices 265. In one embodiment, the emergency alert server 130 can receive physical location information for media processor devices 106A-G from a subscription management server 140. In another embodiment, the emergency alert server 130 can received contact information, such as mobile communication device 265 telephone numbers, electronic messaging (email) addresses, and/or URL addresses for media processor devices 265 from the subscription management server 140. In one embodiment, a subscriber can supply any portion of this information to the emergency alert server 130 through a portal interface.

In step 308, the emergency alert server 130 can receive authorization information an emergency response service 120. In one embodiment, to prevent unauthorized access, the emergency alert server 130 can require an authorization from the emergency response service server 120 before providing subscriber location and contact information. For example, the emergency response service server 120 can be provided with a username and password and/or a digital signing key. If the authorization is verified, in step 312, then in step 316, the emergency alert server 130 can transmit the location information and contact information to the emergency response service server 120. For example, the emergency alert server 130 can periodically report subscriber information to the emergency response service server 120. Alternatively, the emergency alert server 130 can update subscriber information anytime a subscriber is added, deleted, or changes address or contact information. In one embodiment, subscribers can opt in or opt out of the emergency alert service. In one embodiment, subscribers can provide location and contact information for use by the emergency alert server 130 rather than allowing the system 100 to use information from the subscriber management server 140. For example, a subscriber could have a subscription to media services, such as television and movie channels, from a first service provider but one or more other subscriptions for telephone service, internet service, and/or cellular phone service with other providers. If the subscriber wanted to fully participate in the emergency alert service with the first provider, then the subscriber could supply telephone, cellular, and/or internet contact information to the first provider. In one embodiment, a subscriber can log onto a website of the provider through a portal to provide this information.

If an emergency event notification is received in step 320, then in step 324, the emergency alert server 130 can transmit, via an emergency channel, a video stream including evacuation routing information for the media processor devices 106.

In step 328, the emergency alert server 130 can cause the media processor devices 106A-G to select an emergency channel while disabling selection of other media channels according to the evacuation information. In one embodiment, the emergency alert server 130 can distribute the emergency video streams to subscriber devices over the internet protocol television network 150. In one embodiment, each emergency video stream includes an identification of subscriber devices that are targeted to receive the video stream. The identification information can take the form of an internet address, a URL address, a MAC address, or local router or hub information. In one embodiment, the identification information can be encoded into the emergency video stream or can be associated with the stream using a special header or file. In one embodiment, the emergency alert server 130 can deliver the emergency video stream using one or more emergency channels of the internet protocol television network 150. The emergency alert server 130 can place an emergency video stream, targeted to a particular evacuation group 160, on one or more of the emergency channels. The emergency alert server 130 can cause the internet protocol television network 150 to route the emergency channel to a communication switch for the evacuation group. For example, the emergency alert server 130 can determine that an emergency video stream is targeted to a first evacuation group 160 and can cause an emergency channel to be routed to a communications switch that feeds a service area that includes the first evacuation group 160.

In one embodiment, the emergency alert server 130 can cause a communication switch to signal the media processor device 106A to select a specific emergency channel. In another embodiment, the emergency alert server 130 can signal a media processor device 106A to switch to a default channel, where the switch insures that the emergency channel is sent to this channel for reception and decoding at the media processor device 106A. As a result, the subscriber media processor device 106A in the evacuation group 160 selects the emergency channel and presents this channel at its display device 108A. In another embodiment, the emergency alert server 130 causes the media processor device 106A to disable channel switching. In effect, user of the media processor device 106A is forced to watch the emergency channel until the emergency alert server 130 re-enables channel switching.

In one embodiment, if a user acknowledgement is received from the media processor device 106 in step 332, then the emergency alert server 130 can cause the media processor device 106 to enable selection of other media channels. For example, the channel selection functions of the media processor device 106A can be disabled until a viewer has entered a code into the device 106A or otherwise acknowledged that the viewer has seen and understood the contents of the evacuation message. In another embodiment, channel switching at the media processor device 106A can be disabled until the EA server 130 signals to the media processor device 106A that it is permitted to allow a change of channels. For example, channel changes can be disabled until the EA server 130 receives instructions from the ERS server 120 to resume normal operations.

Alternatively, when an emergency event notification is received in step 320, then, in step 340, the emergency alert server 130 can transmit electronic text notification to the mobile communication device 265 in step 340 and/or can transmit an email notification to the subscriber in step 344. In one embodiment, the emergency alert server 130 can send an electronic text message to a mobile communication device 265 based on premises locations associated with the mobile communication devices. For example, a mobile communication device 265 associated with a subscriber can receive a text message associated with the emergency event occurring at a premises 170D of the subscriber. In another embodiment, a location can be determined for the mobile communication device 265, and this location can be used by the emergency response service server 120 and/or the emergency alert server 130 to determine the content of the text message.

Upon reviewing the aforementioned embodiments, it would be evident to an artisan with ordinary skill in the art that said embodiments can be modified, reduced, or enhanced without departing from the scope and spirit of the claims described below. For example, in one embodiment, the emergency alert server 130 can transmit multiple emergency channels so that different emergency evacuation groups receive different channels. In one embodiment, the same emergency routing information can be transmitted on different emergency media channels to provide redundancy.

In one embodiment, the subscriber acknowledgement of the emergency media channel causes an acknowledgement indicator to be transmitted from the media processor device 106A to the emergency alert server 130. This indicator can further be forwarded to the emergency response service server 120. In a further embodiment, if the subscriber fails to acknowledge the emergency media channel, the emergency alert server 130 and/or the emergency response service server 120 cause a notice to be sent to one or more emergency response services personnel to request a follow-up action with the subscriber. For example, a failure to acknowledge can trigger a follow-up telephone call, text, or electronic message to be sent to the subscriber.

In another embodiment, emergency alert server 130 notification actions can be combined. For example, an emergency event notice can cause the emergency alert server 130 to transmit an email message to the subscriber along with forcing the subscriber's media processor device 106A to present an evacuation plan on an emergency media channel. In another embodiment, subscribers who are in an area affected by the emergency event, but not requiring evacuation, can receive email notices or text messages informing them of their non-evacuation status. These messages can further provide information on evacuation areas to assist the subscriber in avoiding interference with evacuation plans.

In another embodiment, the emergency media channel is transmitted through the internet protocol television network by multicasting to an evacuation routing group. In another embodiment, the emergency media channel can be transmitted to individual media processor devices 106A by unicasting. In one embodiment, following an acknowledgement or other termination of the presentation of the emergency media channel, the emergency alert server 130 can cause the media processor device 106A to automatically shut off or to automatically tune to a general information channel, emergency channel, or a new channel. In another embodiment, the emergency alert server 130 can cause the media processor device 106A to automatically return to the previous media channel.

Figure 4:
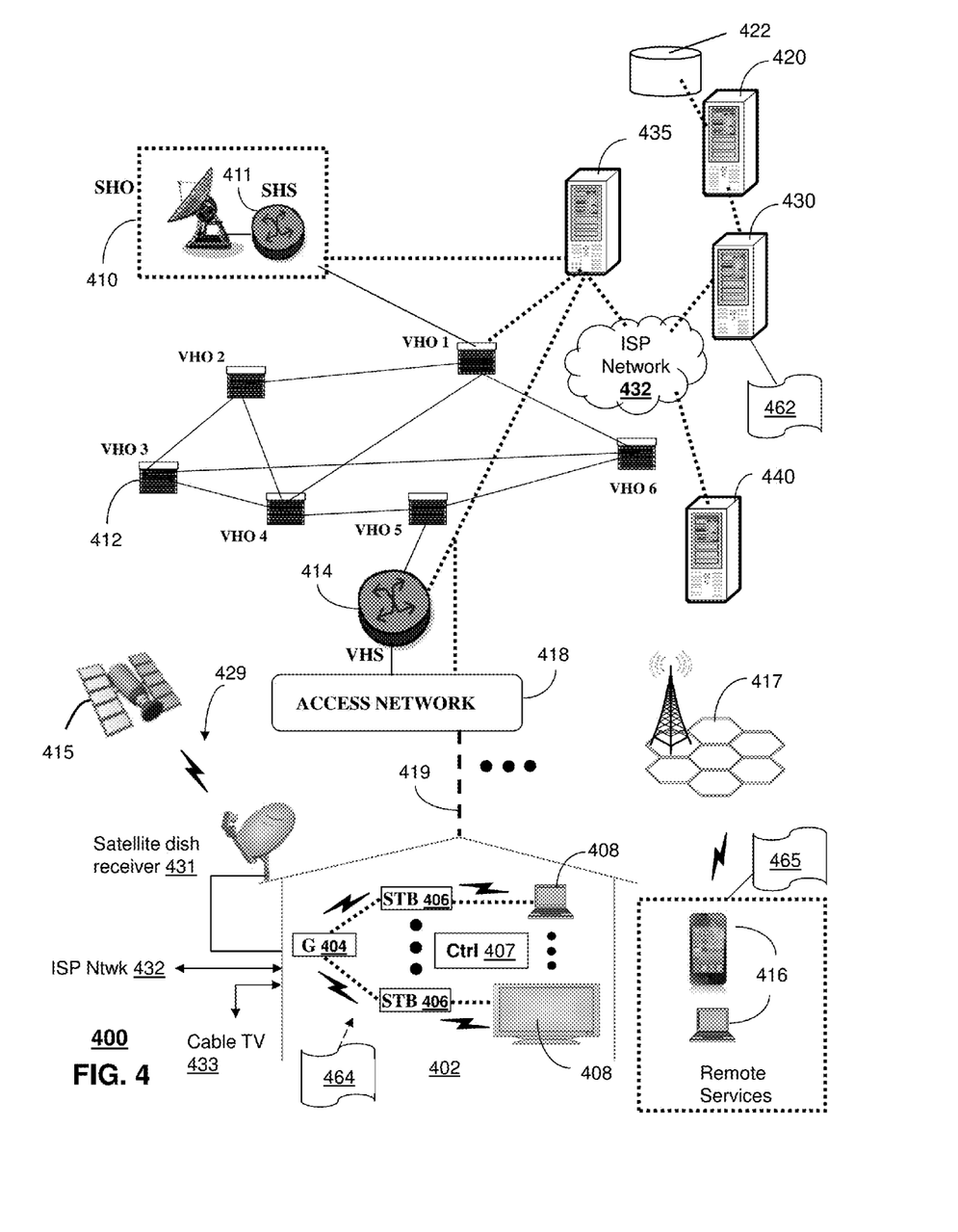
FIGS. 4-5 depict illustrative embodiments of communication systems that provide emergency information.

FIG. 4 depicts an illustrative embodiment of a first communication system 400 for delivering media content. The communication system 400 can represent an Internet Protocol Television (IPTV) media system that can be used for delivering media content and emergency alerts in the system 100 of FIG. 1. The communication system 400 can be utilized to provide media content to a media processor device 406 for presentation by a media display device 408 by means of media server 435 and to provide emergency alert information by means of an emergency alert server 430. A subscriber management server 440 can provide subscriber premises locations and subscriber contact information to the emergency alert server 430. The emergency alert server 430 can further provide this information to an emergency response service server 420, which can be operated by third-party or government entities. The emergency response service server 420 can use the information for generating evacuation plans, routings, and groupings. The evacuation planning can be stored at an evacuation database 422. During non-emergency situations, the media server 435 can provide media programming to premises devices 406, 408, and mobile communication devices 416. When an emergency notification is received, the emergency alert server 430 receives emergency notifications, messages, videos, and/or other information from the emergency response service server 420. The emergency alert server 430 can deliver emergency information by transmitting one or more emergency media channels through the access network 418 and to groups of media processor devices 406 or to mobile communication devices 416 capable of receiving streaming media channels. The emergency alert server 430 can further cause media processor devices 406 and/or mobile communication devices 416 to tune in the emergency media channel(s).

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline, or phone line wiring) or can operate over a wireless access protocol such as Wireless Fidelity (WiFi), Bluetooth®, ZigBee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 406. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 406 or mobile communication devices 416.

Communication system 400 can also provide for all or a portion of the computing devices 430 to function as an emergency alert server 430. The emergency alert server 430 can use computing and communication technology to perform function 462, which can include among other things, providing emergency content to one or more media processor devices 406. The media processors 406 and mobile communication devices 416 can be provisioned with software functions 464 and 465, respectively, to utilize the services of emergency alert server 430.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
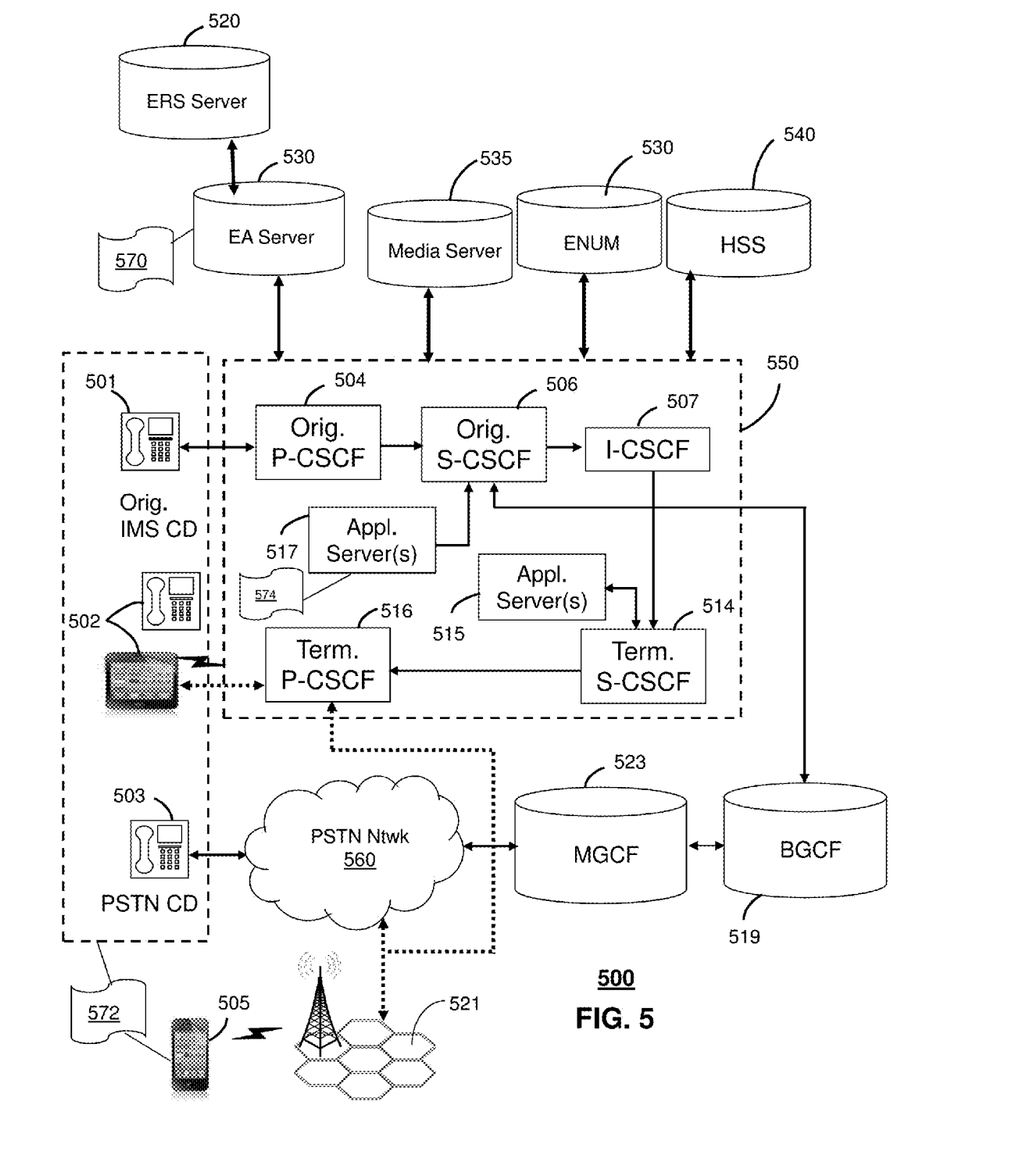

FIG. 5 depicts an illustrative embodiment of a communication system 500 employing IP Multimedia Subsystem (IMS) network architecture to facilitate the combined services of circuit-switched and packet-switched systems. The communication system 500 can represent an IMS media system that can be used for delivering media content, electronic messages, and emails in the system 200 of FIG. 2. Communication system 500 can be overlaid or operably coupled with communication system 400 as another representative embodiment of communication system 400. The communication system 500 can be utilized to provide media content by a media server 535 and bi-directional telecommunication to communication devices (CD) 501-5. The communication system 500 can further be used to provide emergency alert information by means of an emergency alert server 530. Subscriber premises locations and subscriber contact information can be provided to the emergency alert server 530. The emergency alert server 530 can further provide this information to an emergency response service server 520, which can be operated by third-party or government entities. The emergency response service server 520 can use the information for generating evacuation plans, routings, and groupings. During non-emergency situations, the media server 535 can provide media programming to CDs 501-505 while the IMS system 550 provides telecommunications. When an emergency notification is received, the emergency alert server 530 can receive emergency notifications, messages, videos, and/or other information from the emergency response service server 520. The emergency alert server 530 can deliver emergency information by transmitting one or more emergency messages through the IMS network 550 to CDs 501-505.

Communication system 500 can comprise a Home Subscriber Server (HSS) 540, a tElephone NUmber Mapping (ENUM) server 531, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 523 coupled to a PSTN network 560. The MGCF 523 need not be used when a communication session involves IMS CD to IMS CD communications. A communication session involving at least one PSTN CD may utilize the MGCF 523.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 5-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 531 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 600 of FIG. 6.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 523 via a Breakout Gateway Control Function (BGCF) 519. The MGCF 523 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

Emergency alert server 530 can perform function 570 and thereby provide media services to the CDs 501, 502, 503 and 505 of FIG. 5. CDs 501, 502, 503 and 505, which can be adapted with software 572 to perform function 574 to utilize the services of the emergency alert server 530. The emergency alert server 530 can be an integral part of the application server(s) 517 performing function 570, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms that can include features, methodologies, and/or fields that may be described in whole or in part by standards bodies such as Third Generation Partnership Project (3GPP). It is further noted that some or all embodiments of the subject disclosure may in whole or in part modify, supplement, or otherwise supersede final or proposed standards published and promulgated by 3GPP.

Figure 6:
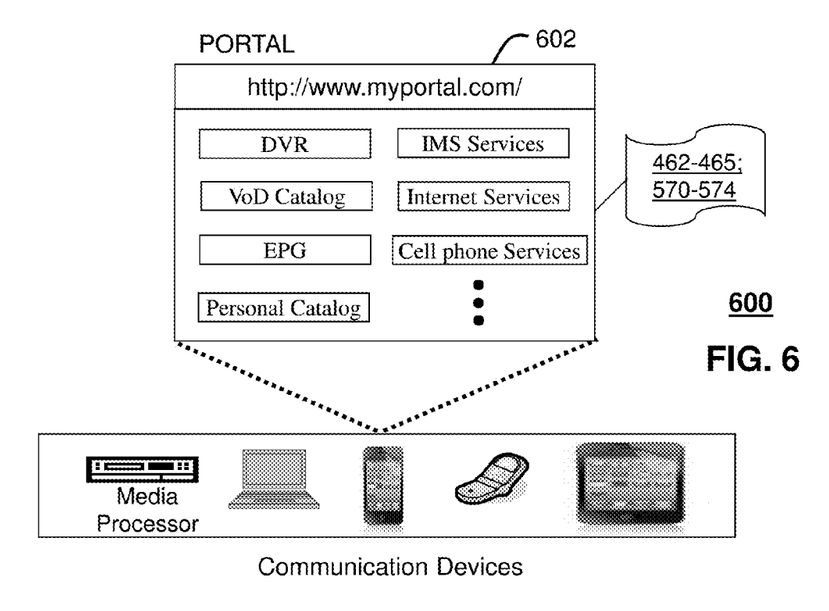
FIG. 6 depicts an illustrative embodiment of a web portal for interacting with the communication systems of FIGS. 1-2 and 4-5.

FIG. 6 depicts an illustrative embodiment of a web portal 602 which can be hosted by server applications operating from the computing devices 430 of the communication system 400 illustrated in FIG. 4. The communication system 400 can be utilized to provide emergency alert information to a media processor device 406 for presentation by a media display device 408. The web portal system 600 can be used to register and maintain subscriber location and contact information and to configure alerts.

The web portal 602 can be used for managing services of communication systems 400-500. A web page of the web portal 602 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 602 can be configured, for example, to access a media processor 106A and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106A. The web portal 602 can also be used for provisioning IMS services described earlier, provisioning Internet services, provisioning cellular phone services, and so on.

The web portal 602 can further be utilized to manage and provision software applications 462-465, and 570-574 to adapt these applications as may be desired by subscribers and service providers of communication systems 400-500.

Figure 7:
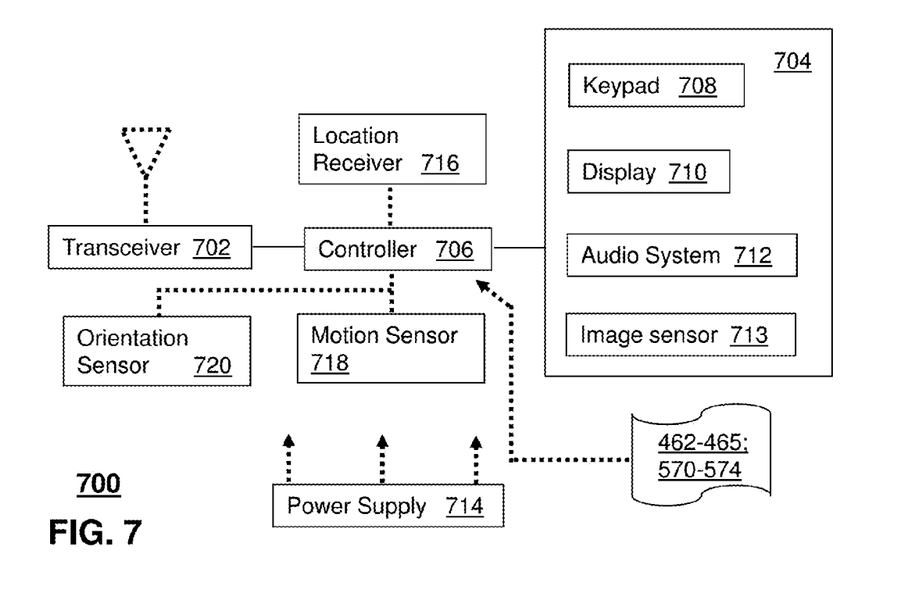
FIG. 7 depicts an illustrative embodiment of a communication device.

FIG. 7 depicts an illustrative embodiment of a communication device 700. Communication device 700 can serve in whole or in part as an illustrative embodiment of the devices depicted or otherwise described in FIGS. 1-6. The communication device 700 can be utilized to receive emergency alert notifications, messages, and/or video streams for display at a media processing device 406, a media display device 408, and/or a mobile communication device 416. The communication device 700.

The communication device 700 can perform an operation associated with the presentation of the emergency alert information at a display according to the first action of the first viewer. The communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the media processor device 406, the media display device 408, and/or the mobile communication devices 416 of FIG. 4, as well as the IMS CDs 501-502 and PSTN CDs 503-505 of FIG. 5. It will be appreciated that the communication device 700 can also represent other devices that can operate in communication systems 400-500 of FIGS. 4-5 such as a gaming console and a media player.

The communication device 700 shown in FIG. 7 or portions thereof can serve as a representation of one or more of the devices of communication systems 600-700. In addition, the controller 706 can be adapted in various embodiments to perform the functions 462-465 and 570-574, respectively.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
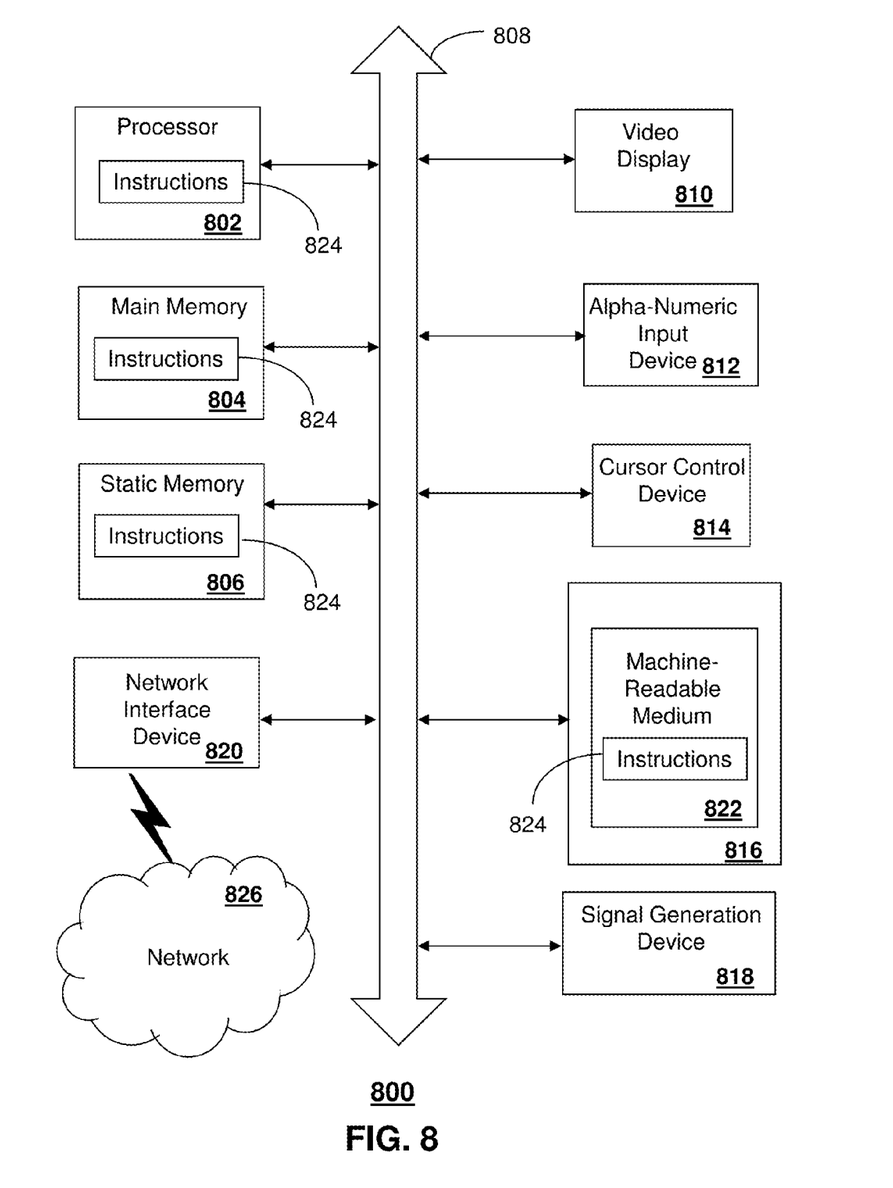
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods describe above. For example, the media processor device 406, the media server device 130, the media display device 408, and/or the gateway device 404, and/or the mobile communication device 416 can comprise a machine in the form of a computer system 800. In some embodiments, the machine may be connected (e.g., using a network 826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee®), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure, including combinations of components and/or steps from the embodiments and/or methods described herein.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a memory that stores instructions; and
a processor coupled to the memory, wherein responsive to executing the instructions, the processor performs operations comprising:
  receiving a notification of an emergency event from an emergency response service, wherein the notification comprises first evacuation routing information based on first location information of a first media processor device;
  creating a multicast group in response to receiving the notification of the emergency event, wherein members of the multicast group comprise the first media processor device;
  transmitting, via a first emergency media channel, a multicast of a first video stream to the members of the multicast group, wherein the first video stream comprises the first evacuation routing information;
  instructing the first media processor device to select the first emergency media channel while disabling selection of other media channels, wherein the first media processor device presents content from the first emergency media channel at a display device;
  determining a first geographic region affected by the emergency event according to first evacuation information; and
  dividing the first geographic region into a plurality of sub-divisions, wherein the plurality of sub-divisions are separated based on a proximity to an evacuation center,
  wherein the multicast group is created for each of the plurality of sub-divisions.

2. The device of claim 1, wherein the first evacuation routing information is associated with a first evacuation group comprising a plurality of media processor devices each assigned the first evacuation routing information, and wherein the operations further comprise instructing each media processor in the first evacuation group to select the emergency media channel responsive to determining that the first evacuation group is within a geographic region.

3. The device of claim 1, wherein the first evacuation routing information comprises an evacuation location.

4. The device of claim 1, wherein the first evacuation routing information comprises a route to an evacuation location.

5. The device of claim 1, wherein the operations further comprise:
  receiving authorization information from the emergency response service; and
  verifying the authorization information, wherein the transmitting of the first location information to the emergency response service is responsive to verifying the authorization information.

6. The device of claim 1, wherein the operations further comprise transmitting via a second emergency media channel a second video stream comprising second evacuation routing information responsive to receiving a second notification of the emergency event from the emergency response service.

7. The device of claim 1, wherein the operations further comprise:
  receiving contact information associated with a mobile communication device of a subscriber associated with the first media processor device;
  transmitting the contact information to the emergency response service; and
  transmitting a first electronic notification of the emergency event to the mobile communication device responsive to receiving the notification of the emergency event.

8. The device of claim 7, wherein the operations further comprise:
  receiving second location information for the mobile communication device; and
  transmitting the second location information to the emergency response service for determining whether the first evacuation routing information applies to the mobile communication device, wherein the first electronic notification comprises the first evacuation routing information responsive to determining that the mobile communication device participates in the first evacuation routing.

9. The device of claim 8, wherein the second location information for the mobile communication device is determined using a global positioning system.

10. The device of claim 1, wherein the operations further comprise:
  receiving a user generated input comprising an acknowledgement that contents of the first video stream have been observed from the first media processor device, wherein the acknowledgement comprises a message indicating that the user has seen and understood contents of the first video stream; and
  instructing the first media processor device to enable selection of the other media channels responsive to receiving the user generated input.

11. The device of claim 1, wherein the operations further comprise receiving a first identification associated with the first media processor device, wherein transmitting via the first emergency media channel comprises transmitting the first video stream according to the first identification.

12. The device of claim 1, wherein the operations further comprise receiving the first video stream from an emergency response service for transmission via the first emergency media channel.

13. The device of claim 1, wherein the operations further comprise:
    determining that the first media processor device is within the first geographic region, wherein instructing the first media processor device to select the first emergency channel is responsive to determining that the first media processor device is within the first geographic region.

14. A non-transitory machine-readable storage medium, comprising instructions, wherein responsive to executing the instructions, a processor performs operations comprising:
    creating a multicast group based on locations of a plurality of communication devices of members of the multicast group in proximity to an area associated with an emergency situation;
    presenting an emergency media channel comprising a video stream of evacuation destination information responsive to a command received from an emergency alert service;
    determining a geographic region affected by the emergency situation according to the evacuation destination information; and
    dividing the geographic region into a plurality of sub-divisions, wherein the plurality of sub-divisions are separated based on a proximity to an evacuation center, and
    wherein the creating the multicast group comprises creating a multicast group for each of the plurality of sub-divisions.

15. The non-transitory machine-readable storage medium of claim 14, further comprising:
    receiving a selection of a media channel of a communication network of a service provider;
    presenting media content that is received from the media channel at a display device in communication with a communication device of the plurality of communication devices, wherein the media content is received by way of a multicast presentation to members of the multicast group;
    switching to an emergency media channel comprising a video stream of evacuation destination information responsive to a command received from an emergency alert service;
    disabling channel switching responsive to a command received from the emergency alert service associated with the multicast group;
    presenting the evacuation destination information at the display device;
    receiving a user generated input comprising an acknowledgement that contents of the video stream have been observed from the communication device, wherein the acknowledgement comprises a message indicating that the user has seen and understood contents of the video stream; and
    re-enabling channel switching responsive to receiving the acknowledgement.

16. The non-transitory machine-readable storage medium of claim 14, further comprising determining that the communication device is within the geographic region, wherein instructing the communication device to select the emergency channel is responsive to determining that the communication device is within the geographic region, wherein the evacuation destination information is associated with an evacuation group comprising a plurality of communication devices each assigned the evacuation destination information.

17. A method, comprising:
    receiving, by a system comprising a processor, a notification of an emergency event;
    receiving, by the system, location information for a plurality of media processor devices;
    determining, by the system, target media processor devices of the plurality of media processor devices based on the location information;
    creating, by the system, a multicast group in response to receiving the notification of the emergency event, wherein members of the multicast group comprise target media processor devices of the plurality of media processor devices;
    transmitting, by the system, via a first emergency media channel, a multicast of a first video stream to the members of the multicast group, wherein the first video stream comprises first evacuation routing information for a first evacuation group responsive to receiving a notification of an emergency event;
    determining a region affected by the emergency event according to evacuation information; and
    dividing the region into a plurality of sub-divisions, wherein the plurality of sub-divisions are separated based on a proximity to the first evacuation routing information, and
    wherein the creating the multicast group comprises creating a multicast group for each of the plurality of sub-divisions.

18. The method of claim 17, further comprising:
    instructing, by the system, a first media processor device to select the first emergency media channel, wherein content of the emergency media channel is presented at a display device by way of the first media processor device; and
    transmitting, by the system, an electronic notification of the emergency event to a mobile communication device of a subscriber associated with the first media processor device.

19. The method of claim 18, further comprising:
    receiving, by the system, first location information of the first media processor device; and
    transmitting, by the system, the first location information to an emergency response service for generating the first evacuation routing information based on the first location information.

20. The method of claim 18, comprising:
    receiving, by the system, contact information associated with a mobile communication device of a subscriber associated with the first media processor device;
    transmitting, by the system, the contact information to an emergency response service; and
    transmitting, by the system, a first electronic notification of the emergency event to the mobile communication device responsive to receiving the notification of the emergency event.

* * * * *